United States Patent [19]

Herrington

[11] Patent Number: 4,650,451
[45] Date of Patent: Mar. 17, 1987

[54] INTERMITTENTLY TRANSLATING DRAW TAPE STRETCHED BETWEEN NIP ROLLS

[75] Inventor: Fox J. Herrington, Holcomb, N.Y.

[73] Assignee: Mobil Oil Corporation, New York, N.Y.

[21] Appl. No.: 789,240

[22] Filed: Oct. 18, 1985

[51] Int. Cl.⁴ .......................... B31B 23/64; D02J 1/06
[52] U.S. Cl. .................................... 493/190; 493/211; 493/225; 493/338; 493/461; 493/928; 264/167; 264/288.8; 264/DIG. 73; 425/384; 425/DIG. 53; 425/DIG. 236; 26/71
[58] Field of Search ............... 493/480, 339, 338, 225, 493/211, 460, 461, 928, 962; 264/167, 288.8, 291, 280, 73, 164, 288.4, DIG. 28, DIG. 73; 425/363, 383, 445, DIG. 17, 66, 76, 367, 384, DIG. 53, DIG. 236; 26/71; 28/243

[56] References Cited

U.S. PATENT DOCUMENTS

| | | | |
|---|---|---|---|
| 1,898,085 | 2/1933 | Dreyfus et al. | 264/167 |
| 2,341,823 | 2/1944 | Smith | 425/DIG. 17 |
| 2,545,868 | 3/1951 | Bailey | 425/DIG. 53 |
| 3,084,731 | 4/1963 | Kugler | 493/225 |
| 3,263,298 | 8/1966 | Holton | 264/288.8 |
| 3,364,293 | 1/1968 | Culpin | 264/167 |
| 3,796,785 | 3/1974 | Rest et al. | 264/288.4 |
| 4,157,235 | 6/1979 | Lagabe et al. | 425/71 |
| 4,389,364 | 6/1983 | Endo et al. | 264/167 |

FOREIGN PATENT DOCUMENTS 885513 12/1961 United Kingdom ....... 425/DIG. 17

Primary Examiner—Frederick R. Schmidt
Assistant Examiner—William E. Terrell
Attorney, Agent, or Firm—Alexander J. McKillop; Michael G. Gilman; Charles J. Speciale

[57] ABSTRACT

A thermoplastic tape having thick and wide end portions with a relatively thin and narrow stretched central portion between them is produced by a first pair of nip rolls running at a slow speed, and a second pair of nip rolls running at a higher speed. The tape between the nip rolls is intermittently moved away from, and toward said first nip rolls to stretch it to produce the relatively thin and narrow central portion. The second pair of nip rolls is mounted on a pivoted arm so that they are movable toward, and away from said first nip rolls. Alternatively, an idler roll between the two pairs is moved toward, and away from, the first nip rolls.

14 Claims, 5 Drawing Figures

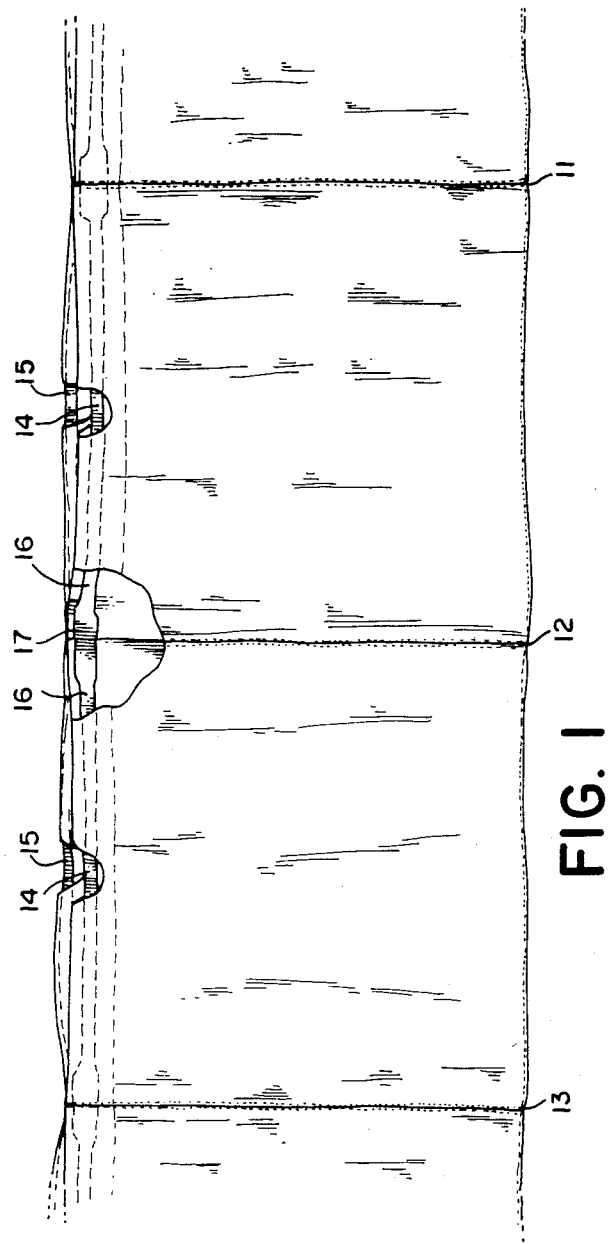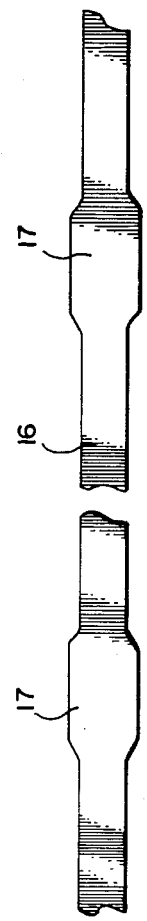

INTERMITTENTLY TRANSLATING DRAW TAPE STRETCHED BETWEEN NIP ROLLS

BACKGROUND OF THE INVENTION

This invention relates to the manufacture of draw tape for thermoplastic bags, and more particularly, to making an intermittently stretched and oriented draw tape.

Bags made of thin polyethylene material have been used in various sizes. Small bags are used in the packaging of sandwiches and the like; larger bags are used as shopping bags; and even larger bags are used for containing trash.

A particularly advantageous closure for such a bag includes a draw tape constructed from the same polyethylene material. U.S. Pat. No. 3,029,853—Piazzi, and British Pat. No. 1,125,363—Jortikka are examples of draw tape bags. Such closures have been successfully employed on these bags.

Draw tape closures for large trash bags, and the manufacture of these draw tape trash bags, are described in the related applications identified below.

In such bags, the tape is preferably unoriented polyethylene which is heat sealed to the opposing panels of the bag at the sides thereof. The weakest part of the draw tape is at the heat seal. This weak point should be located at the point of lowest tensile load, which is furthest from where the user pulls the tape. For this reason, the tape is normally in a hem with a notch at the center of the bag, so that the user grasps the tape at a point furthest from the heat seal.

Economy of manufacture is one of the prime considerations in these bags. The cost of the draw tape is a significant part of the total bag cost, so that any economies in draw tape cost advantageously reduce the ultimate cost of the bag.

As more fully set forth in the Herrington application identified below, an improved draw tape for trash bags of this type has a stretched relatively thin central portion between unstretched, relatively thick and wide end portions of the tape. The end portions are heat sealed at the sides of the bag. This stretched tape has an economic advantage and improved load carrying characteristics.

It is an object of the present invention to provide a method of and apparatus for intermittently stretching thermoplastic tape to produce such draw tapes for bags.

RELATED APPLICATIONS

"METHOD AND APPARATUS FOR MANUFACTURING DRAW TAPE BAGS", Boyd, et al, Ser. No. 652,254, filed Sept. 20, 1984, pending, describes an overall draw tape bag manufacturing line; "METHOD AND APPARATUS FOR FORMING HEMS IN SUPERPOSED PLIABLE PANELS", Boyd et al, Ser. No. 652,255, filed Sept. 20, 1984, now U.S. Pat. No. 4,617,008, describes a hem forming apparatus used with the line; "INSERTION OF DRAW TAPE STRIPS IN DRAW TAPE BAG MANUFACTURE", Boyd, et al, Ser. No. 652,252, filed Sept. 20, 1984, now U.S. Pat. No. 4,597,750, describes the apparatus for inserting the draw tape into the bag. "BAG HAVING INTERMITTENT ORIENTATION DRAW TAPE", Herrington, Ser. No. 722,045, filed Apr. 11, 1985, pending, describes an intermittently oriented draw tape. The foregoing applications are incorporated herein by reference.

SUMMARY OF THE INVENTION

In accordance with the present invention thermoplastic tape is intermittently stretched and oriented by feeding the tape between two pair of nip rolls and intermittently moving the tape toward and away from the first pair of nip rolls. As the tape is moving away from the first pair of nip rolls the tape is stretched to produce relatively thin and narrow portions. As the tape is moved back toward the first pair of nip rolls the stretching is interrupted to produce unstretched thick and wide end portions in the tape.

The translation of the tape is carried out by moving the second pair of nip rolls toward and away from the first pair of nip rolls. Alternatively, an idler between the nip rolls is moved to intermittently stretch the tape and interrupt the stretching.

The draw tape is inserted into the hem of the bag and the thick and wide end portions of the tape are heat sealed at the sides of each bag. In this manner, stretched, oriented, tape forms the bag carrying handle but the tape is heat sealed in unstretched, unoriented, portions of the tape. The apparatus of the present invention is easily synchronized with the bag making machinery which includes means for slitting a tube of extruded polyethylene, forming a hem in the continuous length of film, inserting the draw tape into the hem, heat sealing the tape in the sides of the bag and severing the continuous length of film into individual bags. An advantage of the present invention is its small size and relative simplicity.

The foregoing and other objects, features and advantages of the invention will be between understood from the following more detailed description and appended claims.

SHORT DESCRIPTION OF THE DRAWINGS

FIGS. 1 and 1A show a series of bags with the draw tape made in accordance with the present invention;

DESCRIPTION OF THE PREFERRED EMBODIMENT

FIGS. 1 and 1A show bags for carrying trash and the draw tape for them. They include two panels which are formed from an extruded tube of polyethylene. The sides of the panels are heat sealed and cut from the tube at 11, 12 and 13 in a perpendicular direction. The tube is slit along one side to form open tops in the bag for reception of trash and the like. Hem portions of each panel are folded over adjacent the top. Draw tapes 14 and 15 are secured by the heat seal at the sides of the panels. A cut-out in each panel and hem portion at the middle of the bag, exposes the draw tapes so they can be grasped. When the bag is loaded with trash, the bag is grasped by the draw tape, thereby closing the bag. The draw tapes can thereafter be tied forming a neat bundle.

The draw tape has a relatively thin and narrow central portion 16 of stretched, oriented, polyethylene and end portions 17 at the extremities. The relatively thick and wide end portions are unstretched, unoriented, polyethylene tape. The heat seal which secures the draw tape to the sides of the panels is through the relatively thick and wide end portions.

Figure 2:
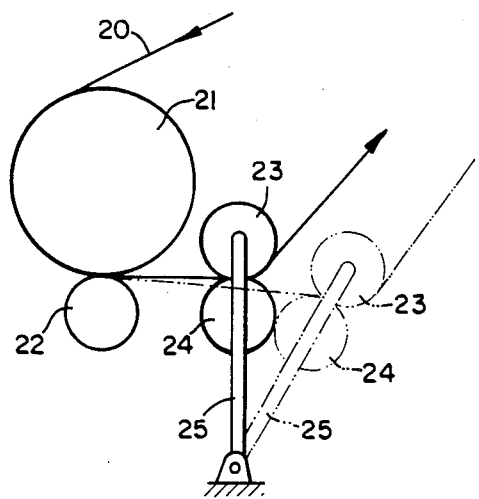
FIG. 2 shows the tape being stretched by moving the second pair of nip rolls.

Referring to FIG. 2 thermoplastic tape 20 is fed to a first pair of nip rolls 21 and 22 and to a second pair of nip rolls 23 and 24. The first pair of nip rolls runs at a relatively slow speed, for example a surface speed of 75 feet per minute and the second pair runs at a higher speed, for example 300 feet per minute. The tape between the rolls is intermittently moved toward the first pair of nip rolls and away from the first pair of nip rolls. As shown in FIG. 2 the nip rolls 23 and 24 are mounted on a pivoted arm 25 which is returned to the full line position to interrupt the stretching. The nip rolls 23 and 24 are intermittently moved away from the first nip rolls, to the broken line position to stretch the tape to produce thin and narrow central portions between the unstretched end portions.

The roll speeds of 75 feet per minute and 300 feet per minute provide a stretch ratio of about 5. The fast rolls 23 and 24 move toward the slow rolls 21 and 22 at approximately 225 feet per minute so the tape is taken away just as fast as it is fed out. During this movement, the tape is not stretched. After about 2 inches of tape have passed, the fast rolls 23 and 24 are moved away from the slow rolls at a speed of 75 feet per minute, thus pulling the tape away at a total speed of 375 feet per minute which is five times the speed at which it is fed from the slow rolls. By intermittently moving the fast rolls toward and away from the slow rolls, the tape is alternately non-oriented, than oriented at a stretch ratio of five.

The slow roll 21 is heated, for example, at a temperature of 225° F. This heats the tape prior to stretching to avoid line drawing, and to produce the smoothly stretched, smoothly oriented tape. The slow roll 23 is cooled, for example at 60° F. This locks in the tape orientation before the tape leaves the stretching apparatus.

At their closest position the two sets of rolls should be as close together as practical in order to achieve sharp definition of changes in orientation. Therefore, they should be small in diameter, but the heated roll must be sufficiently large to transfer enough heat into the tape.

Figure 3:
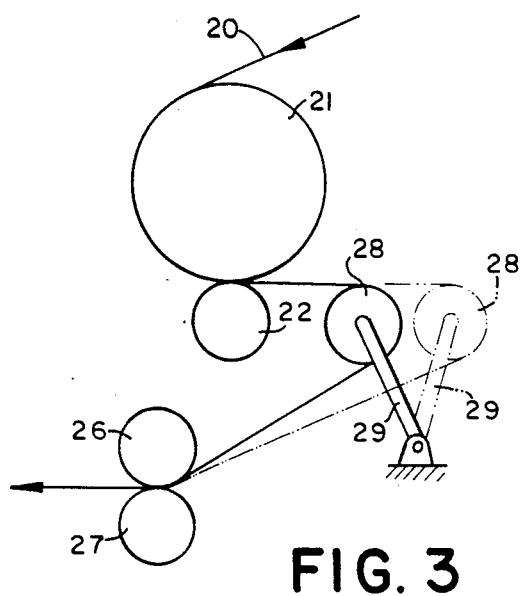
FIG. 3 shows the tape being stretched by moving an idler between the nip rolls.

An alternative embodiment is shown in FIG. 3. The fast rolls 26 and 27 are in a fixed position and the tape length between the rolls is varied by moving an idler roll 28. Idler 28 is mounted on a pivoted arm 9 so that it can be moved toward and away from the first pair of nip rolls 21 and 22. In the example being discussed, the idler roll is moved toward the first pair of nip rolls, to the full line position, at a speed of 112.5 feet per minute. It is moved away from the first pair of nip rolls at a speed of 37.5 feet per minute. The embodiment of FIG. 3 has the advantage that the velocity of the idler roll 28 only has to be half as great as the velocity of the movable nip rolls in FIG. 1. The disadvantage of FIG. 3 is that the full length of tape all the way to the fast rolls is subject to stretching force so that it is difficult to achieve sharp definition of the stretch regions and the idler roll is subjected to a large rotational acceleration.

As in the previous embodiment, the slow roll 21 is heated and the idler roll 28 is cooled to lock in the orientation of the tape. With proper selection of the position and length of arm 29, stretching of the cooled tape after it leaves idler 28 can be minimized.

Figure 4:
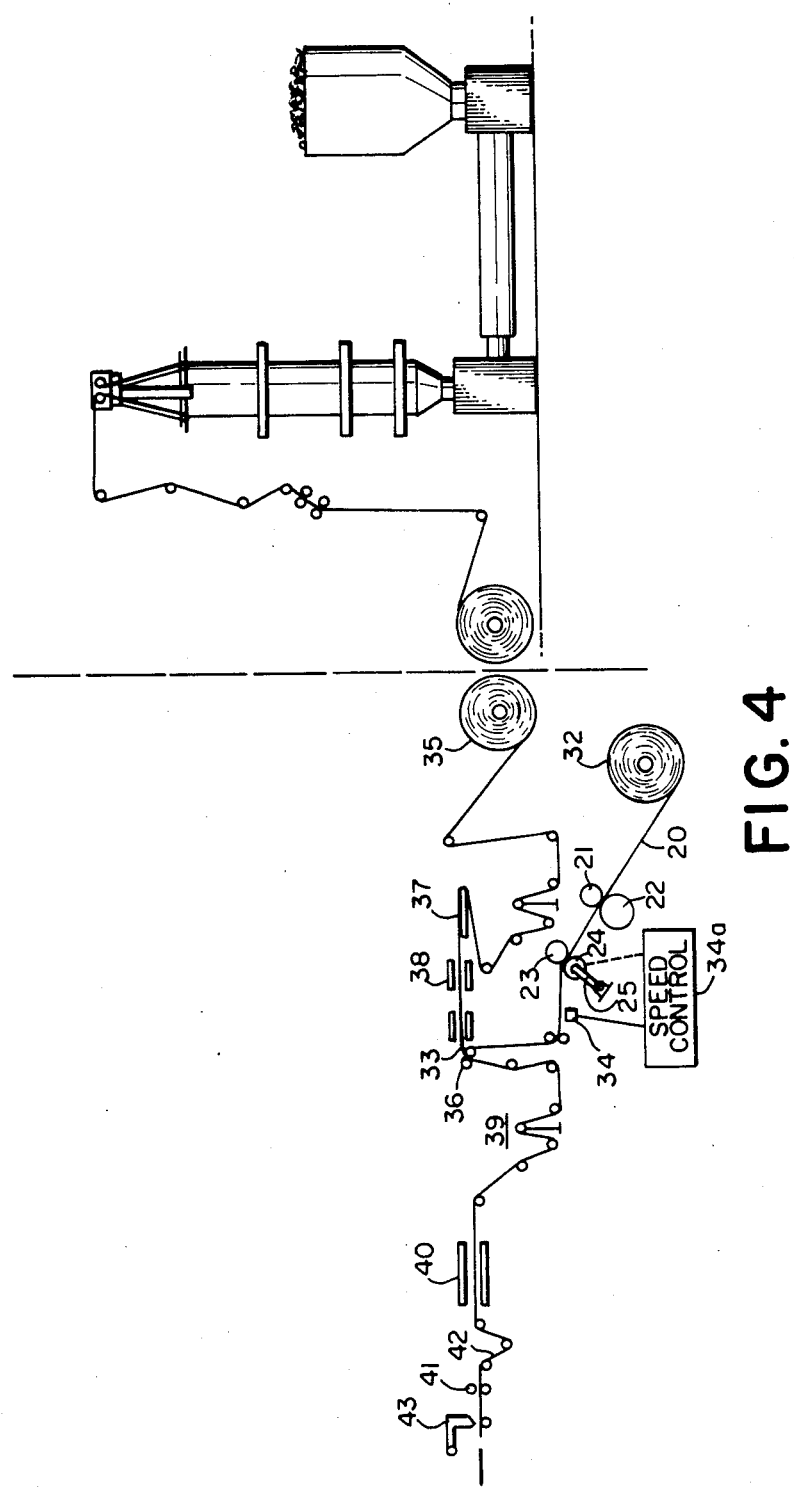
FIG. 4 depicts a manufacturing line for the bags which includes the apparatus of the present invention for intermittently stretching the drawing tape prior to insertion into the bags.

FIG. 4 shows the apparatus of the present invention with bag making machinery. Polyethylene tape from the roll 32 is intermittently stretched by the first pair of nip rollers 21 and 22, and by the second pair of nip rollers 23 and 24.

The stretched tape is fed into the tape inserter 33, where it is inserted into the hem of a continuously moving line of bags. In order to operate the tape stretching apparatus of the present invention in line with this bag making apparatus, it is necessary to synchronize the tape stretcher with the bag machine in two respects:

1. Cyclic register: There must be exactly one interruption for every cycle of the bag machine. This can be done by using a cam to drive the fast rolls back and forth, and driving the cam from the crank in the bag machine which advances the bags so that it makes one revolution every time the bag machine makes one bag.

2. Linear speed match: The linear speed of the exiting oriented tape must be the same as the speed of the film entering the bag machine, in order to match tensions. This can be accomplished by driving the fast roll 24 at the required speed, determined by sensing the tension of the tape between the orienter and the bag machine. A sensor 34 senses this tension and acts through speed control 34a to control the speed of roll 24.

The remainder of the line for producing draw tape bags shown in FIG. 5 is more fully described in the aforementioned applications. Briefly, a roll 35 feeds a continuous, extruded tube of polyethylene which has been slit and folded along a median longitudinal line. The material is drawn from the roll 35 by pinch rollers 36. These draw the folded film, forming the two opposing panels, through a hemmer 37 and through a punch 38 which forms the cut-outs in each panel. The continuous line of bags passes through the tape inserter 33 where the draw tape from the stretching apparatus of the present invention is inserted into each hem of the bag.

The continuous length of film with the draw tapes inserted in the hem thereof is advanced from the pinch rollers 36, through rollers 39 and a hem sealer 40, by means of a second pair of pinch rollers 41. As the length of continuous hem sealed film exits the hem sealer 40, it passes through a set of dancer rolls 42, to the seal cutter assembly 43. The reciprocating heat seal bar carries a knife edge into contact with the moving web in an intermittent action timed to form a heat seal down the sides of each bag at regular intervals along its length. After bonding, the seal bar also severs the continuous length of film through the center of the heat seal, thereby separating individual bags from the continuous length of film.

While a particular embodiment of the invention has been shown and described, various modifications are within the true spirit and scope of the invention. The appended claims are, therefore, intended to cover all such modifications.

What is claimed is:

1. Apparatus for forming a thermoplastic tape having thick and wide end portions with a relatively thin and narrow central portion between the end portions in combination with thermoplastic bag making machinery comprising:

a first pair of nip rolls running at a relatively slow tape propelling speed;

a second pair of nip rolls positioned for receiving a tape fed along a path from said first pair of nip rolls and running at a higher tape propelling speed;

means associated with said two pairs of nip rolls for intermittently lengthening the tape path between said two pairs of nip rolls from an original length to stretch a tape between the pair of nip rolls to produce said relatively thin and narrow central portion and for returning said tape path to said original length to produce unstretched end portions;

means in said bag making machinery associated with said second pair of nip rolls for receiving a draw tape from said second pair of nip rolls and inserting said draw tape into a folded hem of a continuous line of thermoplastic bags; and means in said bag making machinery for heat sealing said draw tape to said folded hem through said thick and wide end portions of said draw tape.

2. The apparatus recited in claim 1 wherein said means for intermittently lengthening and returning comprises means for moving said second nip rolls toward said first nip rolls.

3. The apparatus recited in claim 2 wherein said means for lengthening and returning comprises a pivoted arm, said second pair of nip rolls being mounted on said pivoted arm so that they are movable toward said first nip rolls.

4. The apparatus recited in claim 1 wherein said means for intermittently lengthening and returning comprises:

an idler roll between said first and second pair of nip rolls; and means for moving said idler roll toward and away from said first pair of nip rolls.

5. The apparatus recited in claim 4 wherein said means for moving said idler roll comprises:

a pivoted arm supporting said idler for movement toward and away from said first nip rolls.

6. The apparatus recited in claim 1 wherein one of said first pair of nip rolls is a heated roll to produce heated tape which is smoothly stretched and oriented.

7. The apparatus recited in claim 6 wherein one of said second nip rolls is a cooled roll to lock in the tape orientation.

8. The apparatus recited in claim 6 wherein said means for intermittently lengthening and returning said tape path comprises:

a cooled idler between said first and second pairs of nip rolls for locking in the tape orientation.

9. The apparatus recited in claim 1 further comprising:

control means associated with said second pair of nip rolls for driving said second pair of nip rolls in synchronism with said bag making machinery.

10. The method of intermittently stretching a thermoplastic tape to produce a draw tape having a relatively thin and narrow central portion between thick and wide end portions and inserting the draw tape into a folded hem of a continuous line of thermoplastic bags comprising:

passing a continuous thermoplastic tape along a a path between a first pair of nip rolls running at a relatively slow tape propelling speed and a second pair of nip rolls running at a higher tape propelling speed;

intermittently lengthening the tape path between said two pairs of running nip rolls thereby stretching said thermoplastic tape and producing said relatively thin and narrow central portion;

returning said tape path to an original length thereby producing said unstretched thick and wide end portions;

receiving a draw tape from said second pair of nip rolls and inserting said draw tape into a folded hem of a continuous line of thermoplastic bags; and heat sealing said draw tape to said folded hem through said thick and wide end portions of said draw tape.

11. The method recited in claim 10 wherein said steps of intermittently lengthening and returning the tape path is carried out by:

moving said second pair of nip rolls away from and then toward said first pair of nip rolls.

12. The method recited in claim 11 further comprising:

heating one of said first pair of nip rolls to heat said tape to produce smoothly stretched and oriented tape; and cooling one of said second pair of nip rolls to lock in the tape orientation.

13. The method recited in claim 10 wherein the step of intermittently lengthening and returning the tape path is carried out by:

passing said continuous tape over an idler roll between said two pairs of nip rolls; and moving said idler roll between said first and second nip rolls away from and then toward said pairs of nip rolls to intermittently stretch said tape and intermittently produce unstretched end portions.

14. The method recited in claim 13 further comprising:

heating one of said first pair of nip rolls to produce heated tape which is smoothly stretched and oriented;

cooling said idler roll to lock in the tape orientation.

* * * * *